April 6, 1926.

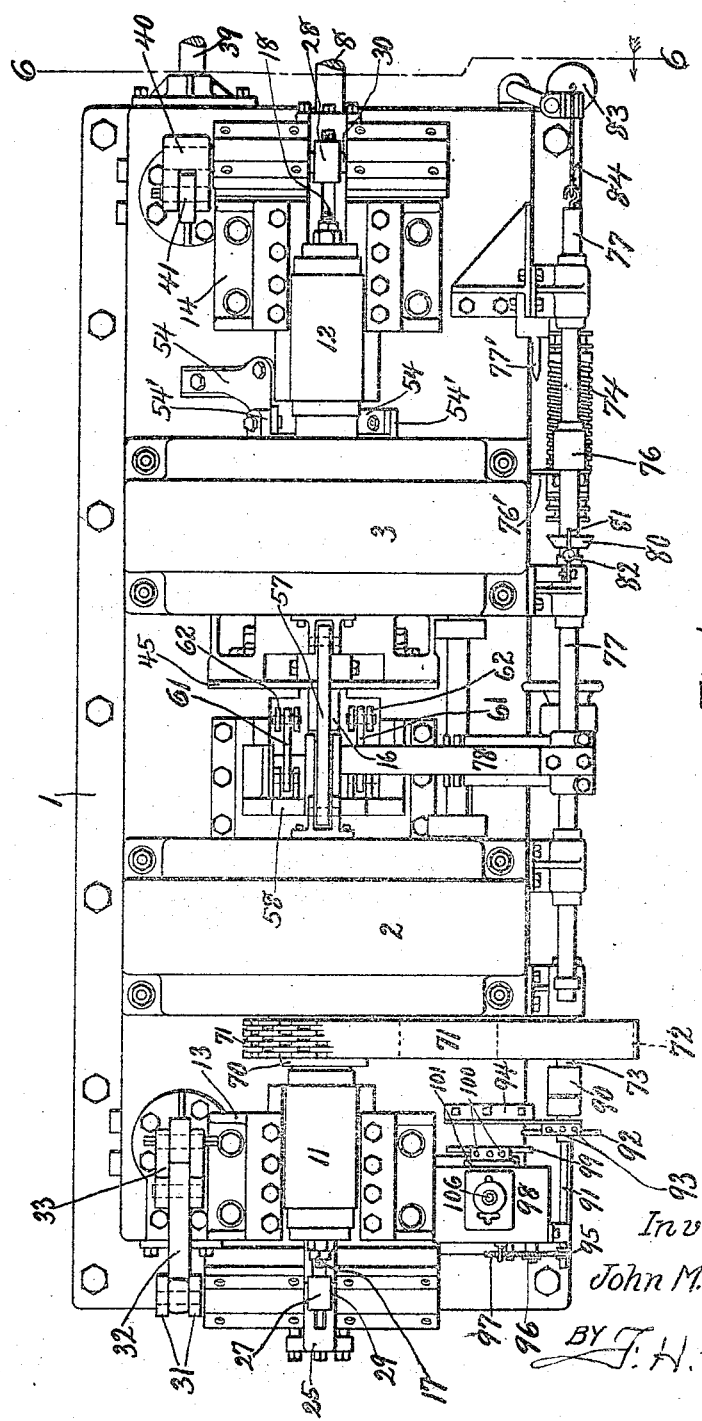

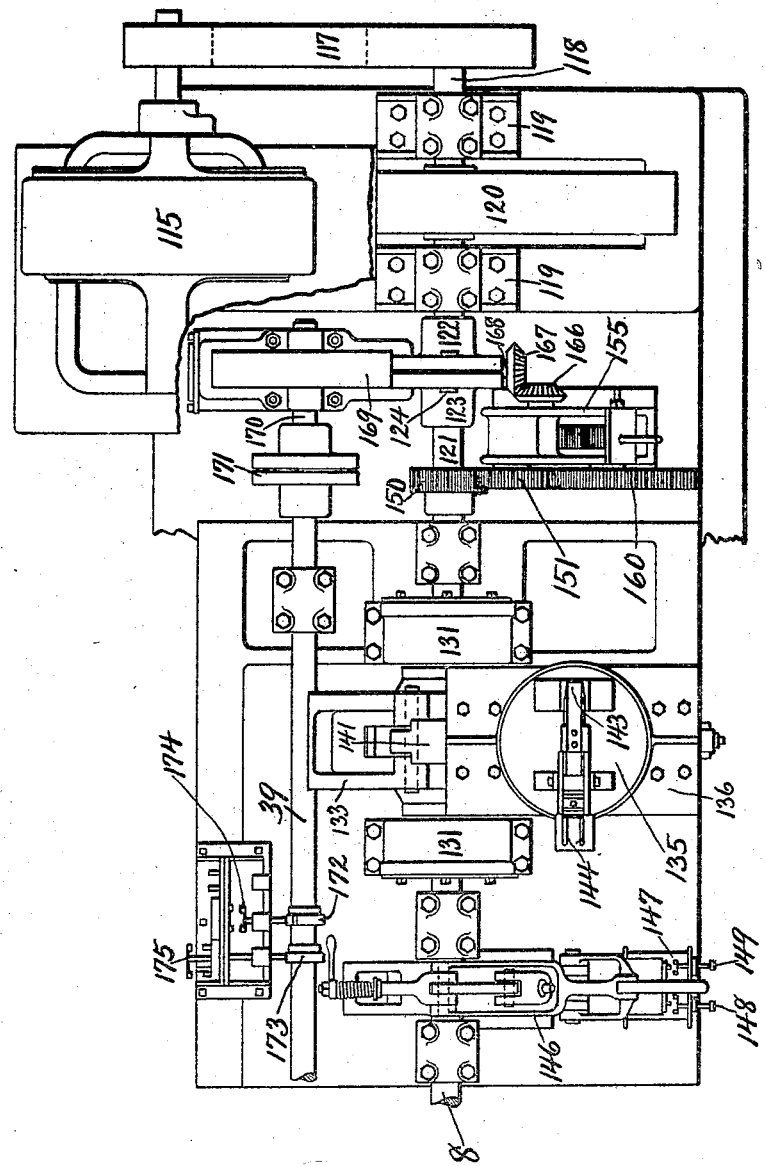

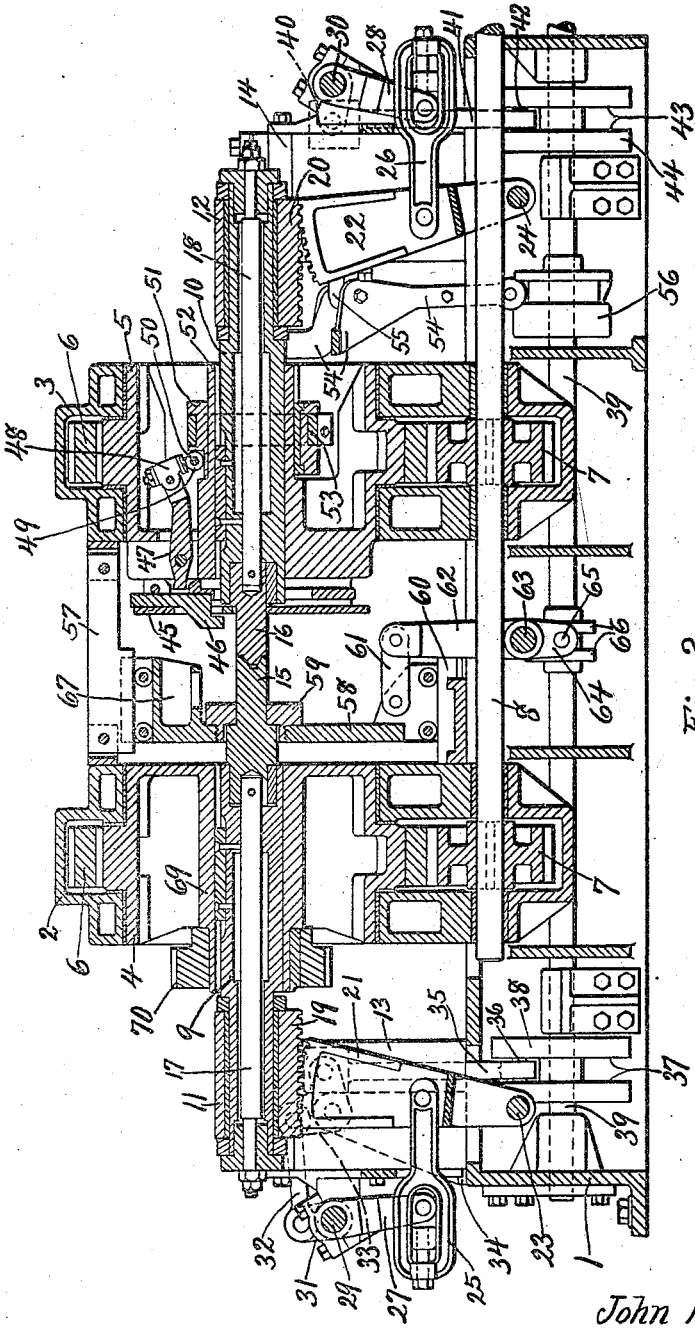

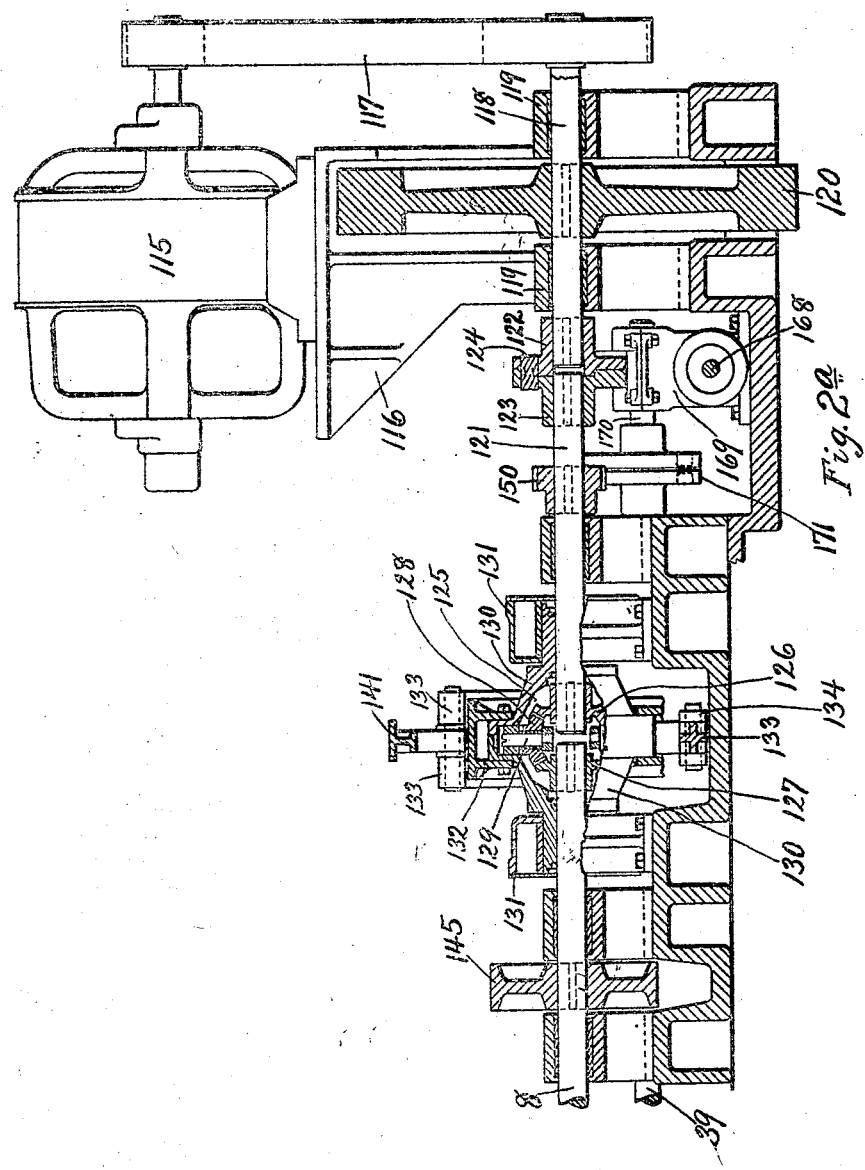

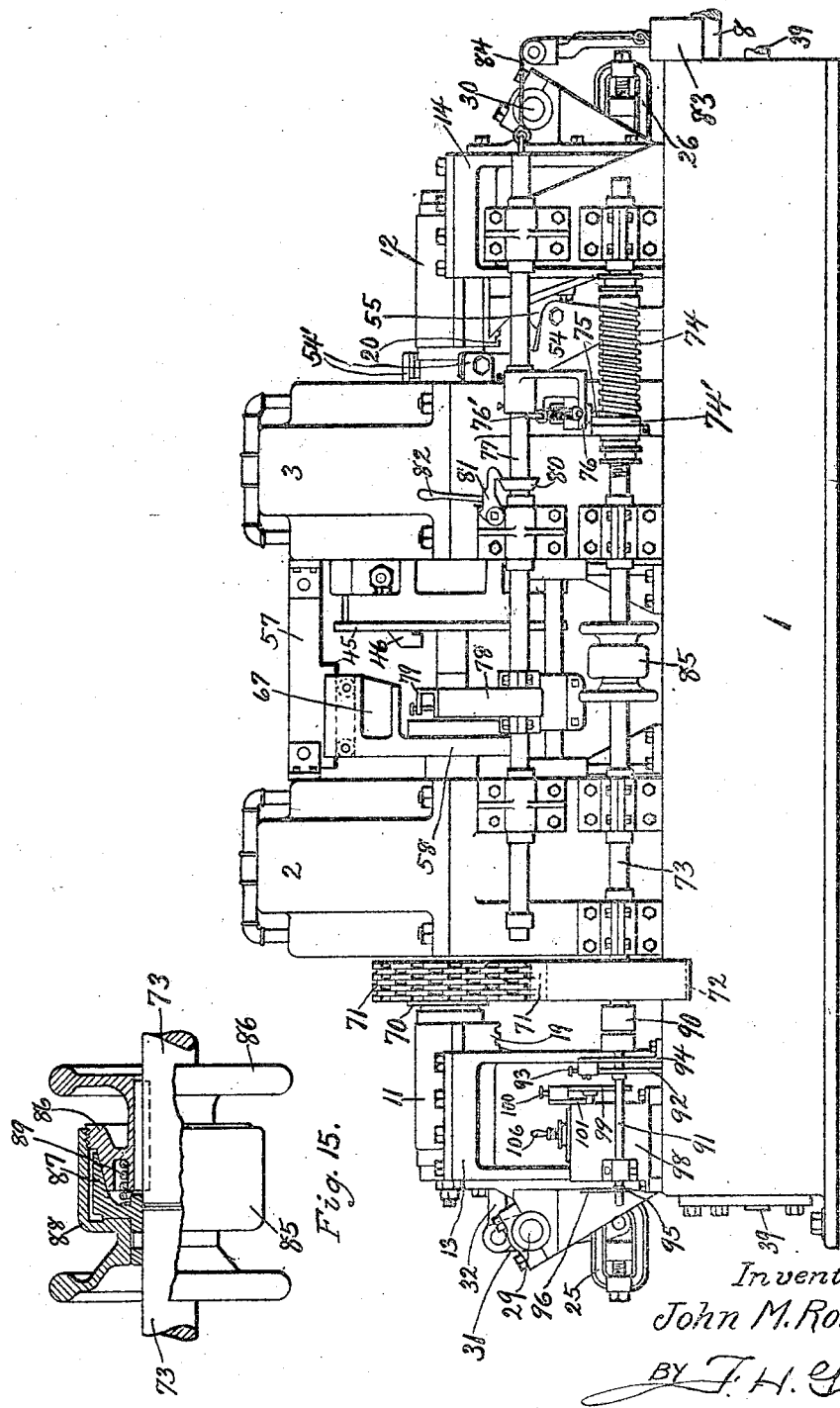

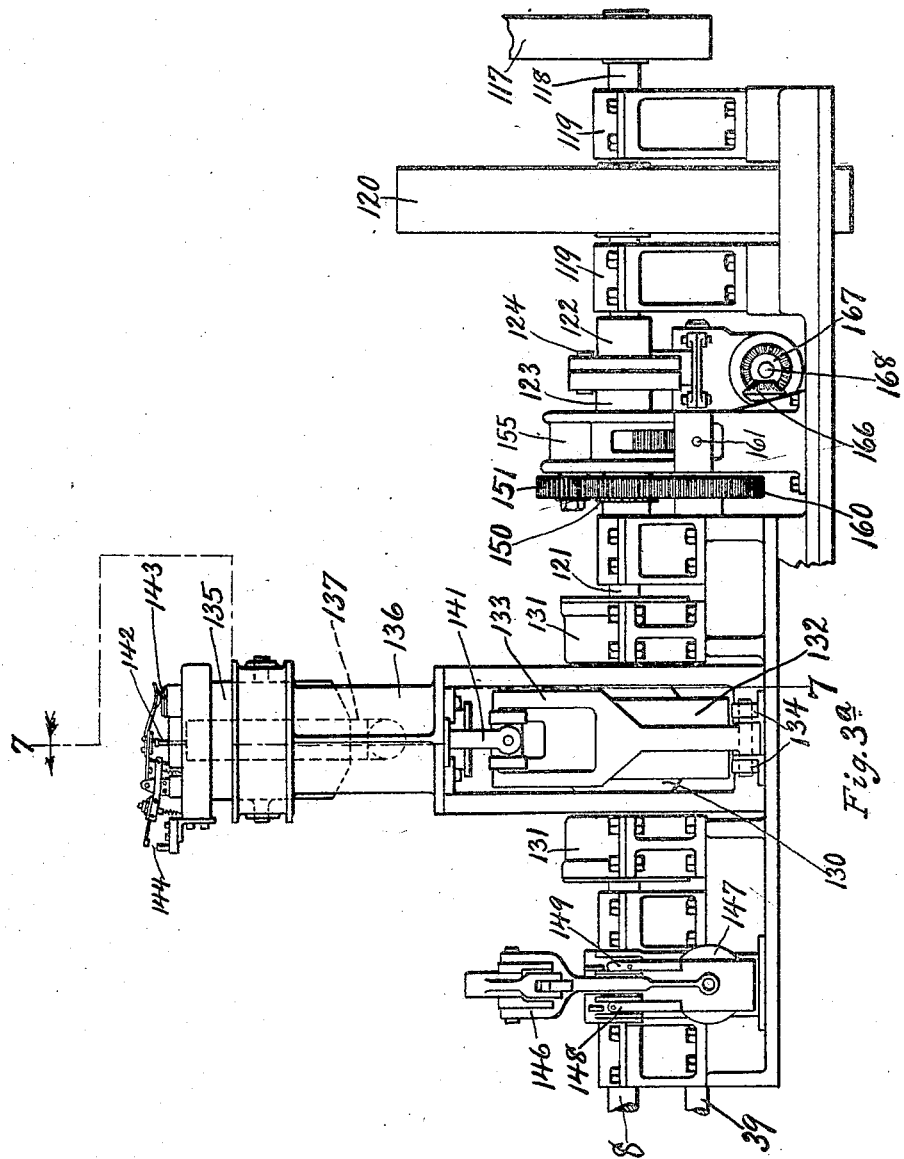

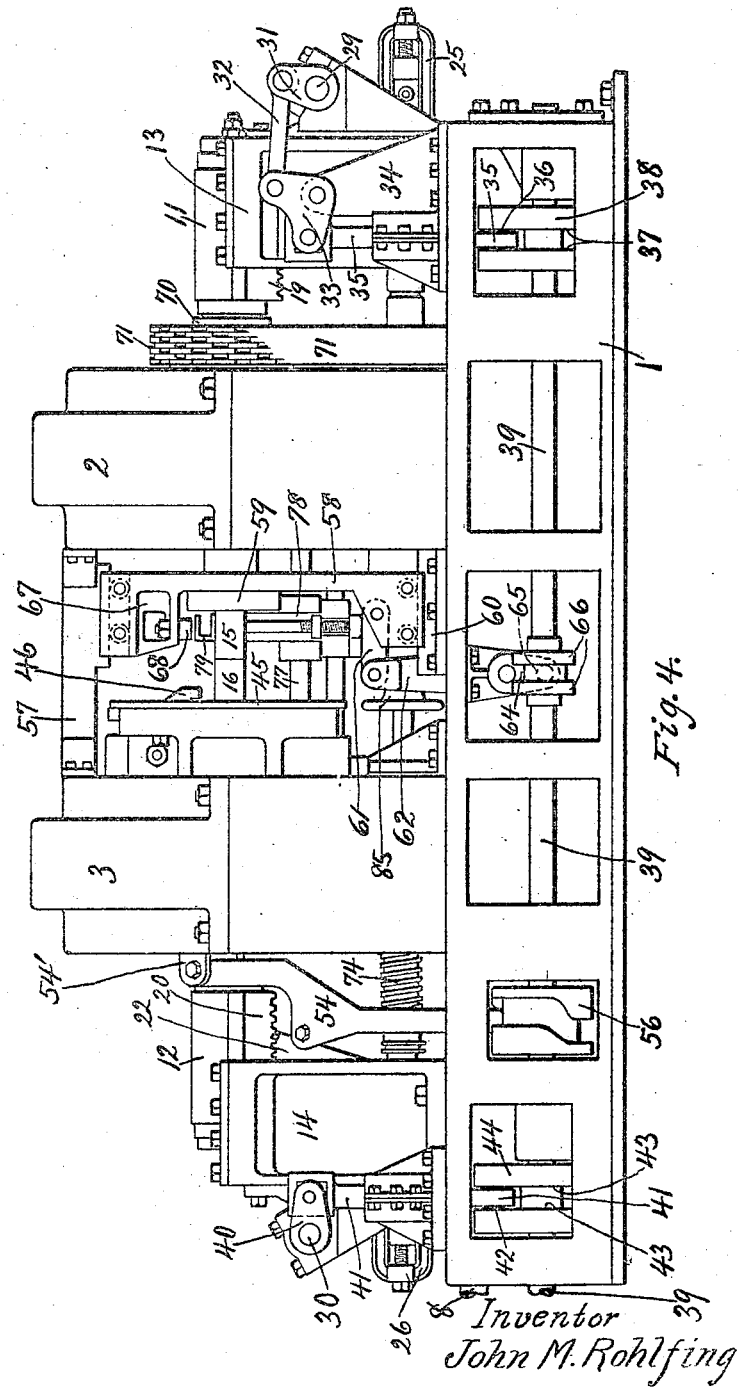

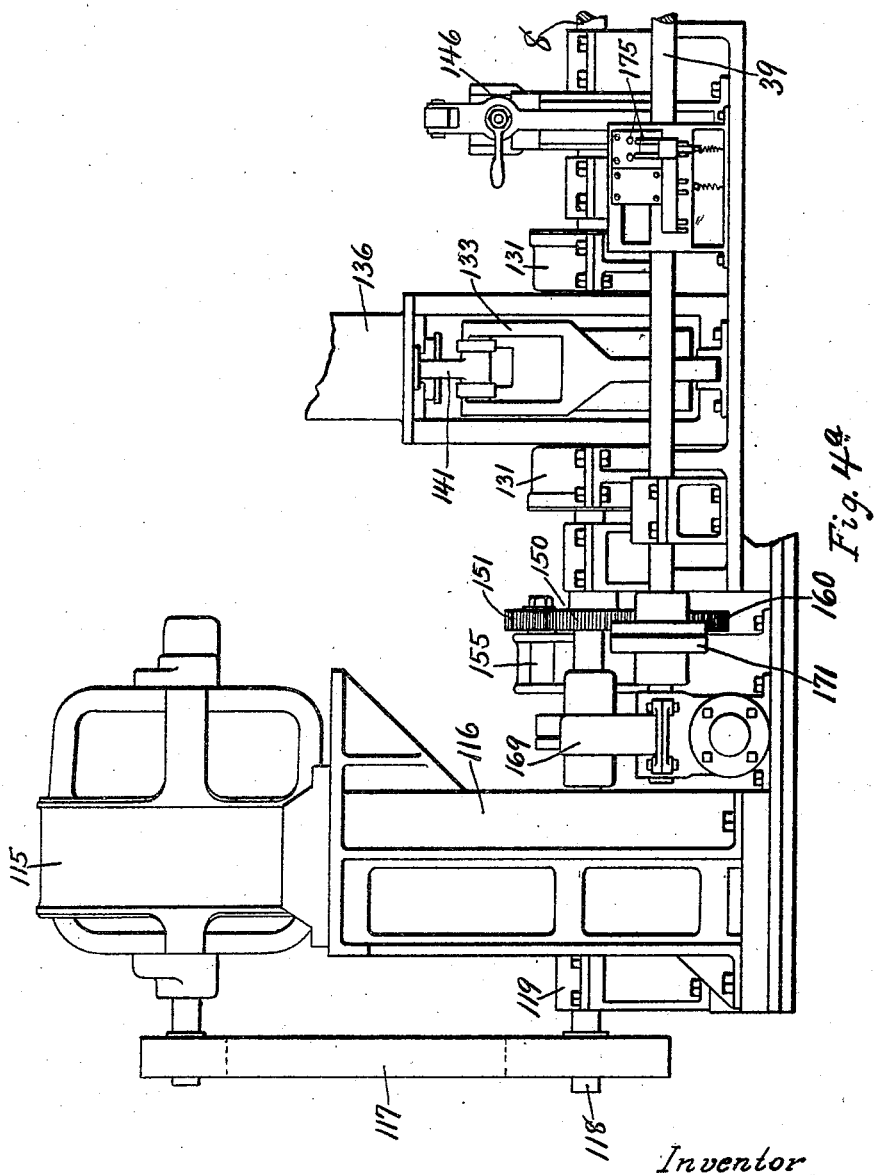

J. M. ROHLFING 1,579,247

SPRING COILING MACHINE

Filed April 17, 1922     12 Sheets-Sheet 9

Inventor
John M. Rohlfing
By J. H. Gibbs
Attorney

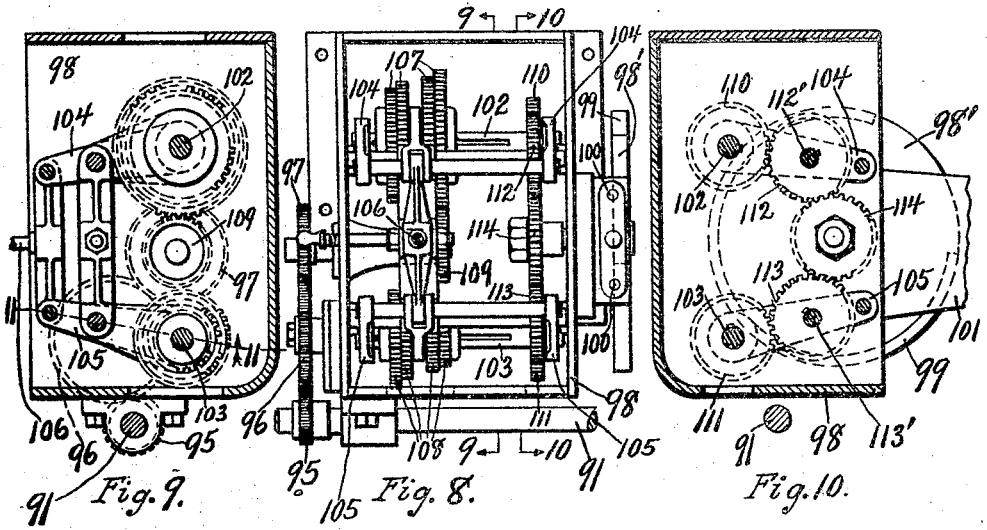
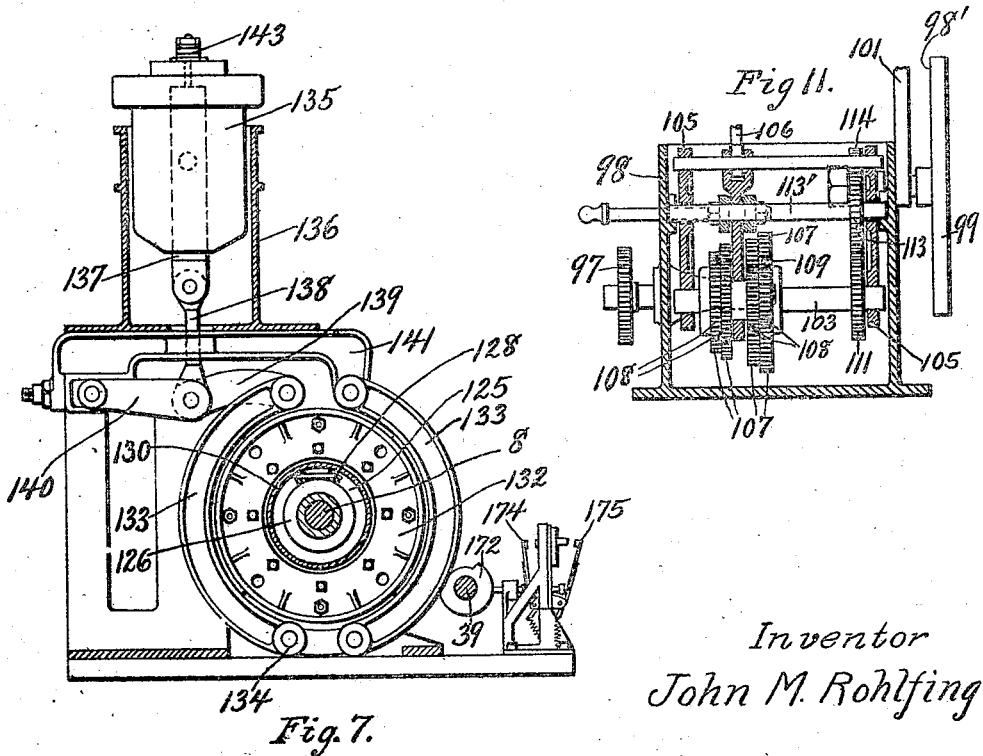

April 6, 1926. 1,579,247
J. M. ROHLFING
SPRING COILING MACHINE
Filed April 17, 1922   12 Sheets-Sheet 11
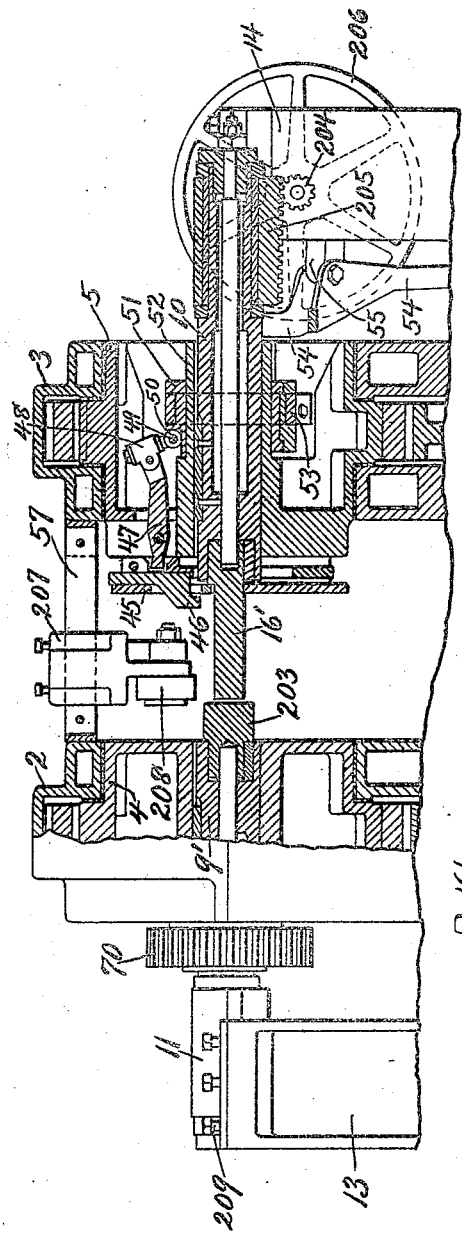
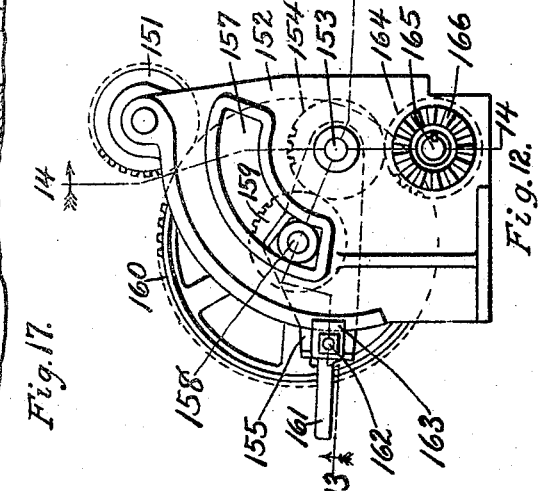
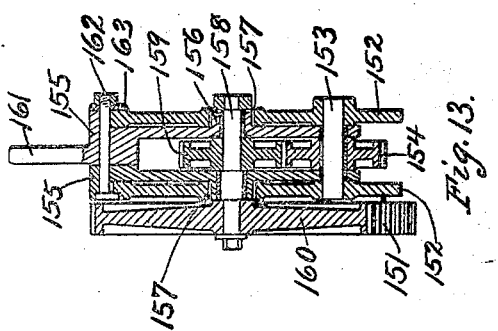
Inventor
John M. Rohlfing
By J. H. Gibbs
Attorney Patented Apr. 6, 1926.

1,579,247

UNITED STATES PATENT OFFICE.

JOHN M. ROHLFING, OF PLAINFIELD, NEW JERSEY, ASSIGNOR TO AMERICAN CAR AND FOUNDRY COMPANY, OF NEW YORK, N. Y., A CORPORATION OF NEW JERSEY.

SPRING-COILING MACHINE.

Application filed April 17, 1922. Serial No. 554,320.

*To all whom it may concern:*

Be it known that I, JOHN M. ROHLFING, residing at Plainfield, Union County, State of New Jersey, and being a citizen of the United States, have invented certain new and useful Improvements in a Spring-Coiling Machine, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

In said drawings:

Figs. 1 and 1ª, when placed end to end, constitute a top plan view, partly broken away, of my improved spring coiling machine;

Figs. 2 and 2ª, when placed end to end, constitute a central vertical section of my device;

Figs. 3 and 3ª, when placed end to end, constitute a front elevation of my device, the driving motor and its stand being omitted;

Figs. 4 and 4ª, when placed end to end, constitute a rear elevation, partly broken away, of my device;

Fig. 7 is a section taken on the line 7—7 of Fig. 3ª;

Fig. 8 is a plan view of a gear set used in timing the electrical control of my device;

Fig. 9 is a section taken on the line 9—9 of Fig. 8;

Fig. 10 is a section taken on the line 10—10 of Fig. 8;

Fig. 11 is a section taken on the line 11—11 of Fig. 9;

Fig. 12 is an elevation of a gear set that drives the timing shaft of my device;

Fig. 13 is a section taken on the line 13—13 of Fig. 12;

Fig. 14 is a section taken on the line 14—14 of Fig. 12;

Fig. 15 is a view, partly in elevation and partly in section, of a clutch used in my device;

Fig. 17 is a partial central vertical section of a modified form of the winding portion of my device.

Figure 5:
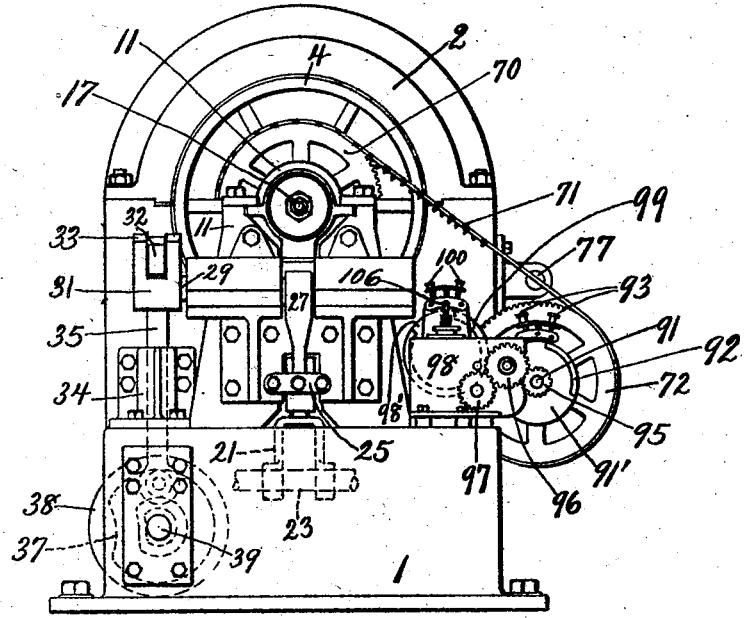
Fig. 5 is an end view of my device taken at the left of Figs. 1, 2 and 3.
Figure 6:
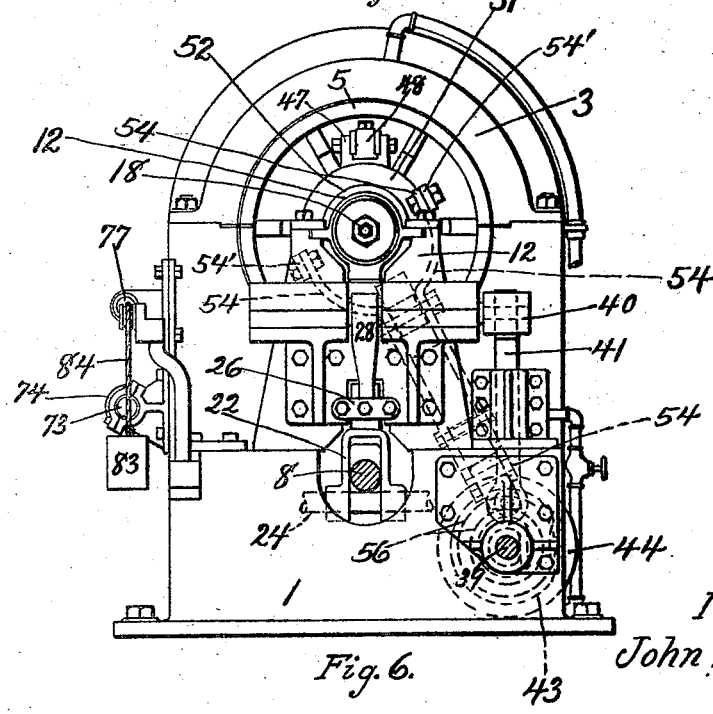
Fig. 6 is a section taken on the line 6—6 of Fig. 1.

It is the object of my invention to provide an improved spring coiling machine that may be adjusted to wind coils of different sizes at the same rate.

It is also an object of my invention to provide an electrical control for a spring coiling machine that will be automatic in its operation and which will tend to maintain a uniform rate of production for the machine.

With these and other objects in view my invention comprises a unitary bed plate on which both the driving and winding portions of my machine are mounted. The winding portion comprises a base 1 on which are mounted a plurality of divided water-cooled casing 2 and 3. Rotatably mounted in the casings 2 and 3 are the heads 4 and 5 having secured thereto ring gears 6 which engage with gears 7 mounted on a main drive shaft 8 journaled in bearings carried by the base 1. Slidably mounted in the heads 4 and 5 but keyed thereto so as to rotate therewith are the hollow spindles 9 and 10 having reduced ends journaled in boxes 11 and 12 which are slidably mounted in the pedestals 13 and 14. Mandrels 15 and 16 are mounted in the spindls so as to rotate therewith and are held in position by rods 17 and 18 which extend through said spindles and have threaded projecting ends on which lock nuts are placed. The journal boxes 11 and 12 have racks 19 and 20 formed integral therewith, the racks being engaged by toothed segments 21 and 22 pivotally supported on rods 23 and 24 carried by the base 1. Pivotally connected to the segments 21 and 22 are links 25 and 26 which are adjustably connected with crank arms 27 and 28 carried by shafts 29 and 30 mounted in bearings on the pedestals 13 and 14. The shaft 29 is operated by a crank 31 connected by a link 32 to one arm of a bell-crank 33 pivotally mounted on a bracket 34 carried by the base 1. The other arm of the bell-crank 33 is connected to a rod 35 which is reciprocated vertically by the engagement of a pin 36, secured in the rod 35, in cam slots 37 in cam disks 38 carried by a cam shaft 39 mounted in bearings carried by the base 1. The shaft 39 is operated by a crank 40 which is connected to the upper end of a rod 41 adapted to be reciprocated vertically by a pin 42, secured in the other end of the rod, engaging in cam slots 43 in cam disks 44 carried by the cam shaft 39. The cams 38 and 44 are designed to effect the simultaneous operation of the spindles 9 and 10 so that the mandrels 15 and 16 will be retracted and advanced simultaneously. Slidably mounted in guides and having a portion projecting through an opening in a work-engaging plate 45 carried by the head 5 is a work-holding dog 46 operated by a lever 47 pivotally mounted on the head 5. One end of the lever 47 has pivotally secured thereto a tubular member 48 in which is adjustably secured a T-shaped member 49 that is pivotally connected by pin 50 to a sleeve 51 which is slidably mounted on the hub portion 52 of the head 5 but rotates therewith. A collar 53 slidably mounted in a groove in the sleeve 51 is pivotally connected by links 54', see Figs. 1, 3 and 4, to the lever arms 54 which are pivotally supported from a bracket 55 carried by the pedestal 14 and operated by engagement with a cam 56 carried by the shaft 39. Operation of the levers 54, in one direction, by the cam 56 will cause the lever 47 to move the dog 46 toward the mandrel 16 to hold the end of the heated stock in engagement with the mandrel, and operation of the levers 54 in the opposite direction will cause the dog 46 to be moved away from the mandrel 16 to release the work. The cam 56 is timed so that the dog 46 will be brought toward the mandrel 16 after the mandrels 15 and 16 have been brought together and will be moved away from the mandrel 16 before the mandrels 15 and 16 are drawn apart.

Joining the casings 2 and 3 is a cross member 57 which serves to guide the upper end of a movable member 58 upon which a face plate 59 is mounted. The lower end of the member 58 engages guide blocks 60 mounted on the base 1 and is connected by links 61 to crank arms 62 carried by a shaft 63 having a crank arm 64 provided with a projecting pin 65 engaging between the cams 66. The member 58 is provided with a projecting portion 67 to which is secured a member 68, see Fig. 4, that forces the end of the stock into engagement with the mandrel 15. The cams 66 are timed to move the member 58 and face plate 59 forward at the time the mandrels 15 and 16 are brought together and to hold the face plate 59 in its forward position until the mandrels are withdrawn from the work, whereupon the face plate 59 is moved back and the finished spring allowed to drop from the machine. The member 68, forcing in the end of the stock, puts the finished spring under a slight compression between the face plates 45 and 59. Keeping the face plate 59 in its forward position keeps the spring under the slight compression and prevents it binding upon the mandrels 15 and 16 as the mandrels are withdrawn.

Keyed to the hub portion 69 of the head 4 is a sprocket 70 which is connected by a chain 71 to an identical sprocket 72 keyed to a shaft 73 mounted in bearings carried by the base 1, the shaft 73 thus being rotated at the same speed as the heads 4 and 5. Mounted on the shaft 73 is a divided pitch screw 74, the pitch screw 74 being formed in sections that can be fitted together about the shaft 73 so that the pitch screw may be readily changed in order to adapt the machine to wind springs of different kinds. Engaging in the groove of the screw 74 is a spring pressed plunger 75 slidably mounted in a bracket 76 secured to a rod 77 adapted to slide in brackets carried by the machine. A bracket 78 carried by the rod 77 has a portion 79 that serves as a guide for feeding the stock to the mandrel as the rod 77 is shifted by the engagement of the plunger 75 with the groove of the pitch screw 74. A collar 80 secured to the rod 77 is engaged by a latch 81 when the rod 77 has reached the limit of its movement and when the rod 77 is released by operating the latch 81 by the handle 82 the rod 77 is returned to the position in which winding is started by a weight 83 connected to the rod 77 by a cable 84. Adjustably mounted on the pitch screw 74 is a cam 74' which is positioned so as to be engaged by the spring pressed plunger 75 to limit the movement of the rod 77 by the pitch screw 74. When the plunger 75 engages the cam 74' the plunger 75 is forced up in the bracket 76 so as to be engaged by a spring operated latch 76'. The latch 76' will hold the plunger 75 clear of the grooves of the pitch screw 74 as the rod 77 is returned by the weight 83 and when the rod 77 is returned to its position for beginning the winding of the next spring, the latch 76' engages a projecting arm 77', see Fig. 1, and releases the plunger 75 to engage in the groove in the pitch screw 74.

The shaft 73 is divided and the parts are joined by a clutch 85 comprising a clutch member 86 splined to one portion of the shaft 73, a clutch member 87 secured to the other portion of the shaft and a member 88 adapted to have threaded engagement with the member 86 and to force the members 86 and 87 into engagement against the action of the spring 89. With the member 88 disengaged from the member 86, the spring 89 will separate the members 86 and 87 disconnecting the shaft sections and making it possible to rotate the pitch screw 74 so as to time the pitch screw 74 with the work-holding dog 46.

Connected to shaft 73 by a clutch 90, similar in construction to clutch 85, is a shaft 91 on which is mounted an insulation disk 91', see Fig. 5, carrying an electrical contact 92 that is engaged by a pair of contacts 93 carried by a bracket 94 mounted on the bed 1. On the shaft 91 is a gear 95 which through the gears 96 and 97, see Fig. 8, and the gear set in gear case 98, drives an insulation disk 98' carrying an electrical contact 99 which is engaged by a plurality of contacts 100 carried by a bracket 101 mounted on the gear case 98. The clutch 90 permits of the shaft 91 being turned with respect to the shaft 73 so that the contacts 92 and 99 may be timed with respect to the work-holding dog 46. As shown in Figs. 8, 9, 10 and 11, the gear set in gear case 98 comprises the movable shafts 102 and 103 carried by sets of arms 104 and 105 that are operated simultaneously by a handle 106. Splined on the shafts 102 and 103 are groups of gears 107 and 108, any gear of which may, through the moving of the shafts 102 and 103 and the shifting of the gears on the shafts, be made to engage with a gear 109 keyed to the shaft driven by the gear 97. On the shafts 102 and 103 are keyed gears 110 and 111, respectively, which engage gears 112 and 113 carried by shafts 112' and 113', respectively, the shafts 112' and 113' being supported in bearings formed in the casing 98 and forming the pivotal axes of the pairs of arms 104 and 105, respectively. Both the gears 112 and 113 engage a gear 114 keyed to the shaft on which the disk 98', carrying contact 99, is mounted. The gear set provides a convenient means for timing the contact 99 with respect to the contact 92, the contact 92 through its connection with shaft 73 revolving once for each revolution of the heads 4 and 5, that is, once for each coil in the spring while the contact 99, by means of its gear drive, is made to revolve once for each spring, the gear set being adjusted to maintain this condition when a change is made in the number of the coils in the springs wound.

To operate the machine there is provided a motor 115 mounted upon a suitable stand 116, or in any desired manner, so that a sprocket on the motor shaft may be connected by chain 117 to a sprocket on a shaft 118. The shaft 118 is supported in bearings 119 and has keyed thereon, between said bearings 119, a weighted fly-wheel 120. Connecting the shaft 118 to a shaft 121, which drives the main drive shaft 8 through a differential gear 125 is a coupling comprising a coupling member 122 keyed to the shaft 118 and a coupling member 123 keyed to the shaft 121, the coupling members being joined by pins 124 fitting into openings in the coupling members and having portions of reduced diameter adapted to limit, by breaking, the power they can transmit. The differential gear 125, as shown in Figs. 2ª and 7, comprises gears 126 and 127 keyed to shafts 121 and 8, respectively, and a plurality of gears 128 which engage with both gears 126 and 127 and are rotatably mounted on bearing pins 129 carried by a casing 130 rotatably mounted in bearings 131. Secured to the casing 130 is a brake drum 132 engaged by brake shoes 133 pivotally mounted as at 134. The brake shoes are operated by a solenoid 135 pivotally mounted on a support 136 and having an armature 137 connected by a link 138 to the point of connection of the toggle arms 139 and 140. The toggle arm 139 is pivotally connected to one brake shoe 133 while the toggle arm 140 is adjustably connected to a link 141 pivotally connected to the other brake shoe 133 and slidably mounted on guides formed on the support 136. Energizing the solenoid 135 will attract the armature 137 and operate the toggle arms 139 and 140 to apply the brake shoes 133 to the brake drum 132 and prevent rotation of the casing 130. With the casing 130 held against rotation the shaft 121 will drive the shaft 8 through gears 126, 128 and 127. When the solenoid 135 is deenergized, the armature 137 will fall of its own weight and will release the brake shoes 133 from the brake drum 132 permittting the casing 130 to rotate and the shaft 8 to stop rotating. To the armature 137 is secured a plunger 142 adapted, when solenoid 135 is energized, to open contacts 143 and close contacts 144. When the solenoid 135 is deenergized the plunger 142 is withdrawn and springs close contacts 143 and open contacts 144.

On the shaft 8 is secured a brake drum 145 engaged by a brake mechanism 146. The brake mechanism 146 is of the usual elevator brake type and is applied by a spring when the operating solenoid 147 is deenergized and released when the solenoid 147 is energized. As shown in Figs. 1ª and 3ª, a plurality of contacts 148 and 149 are operated by the brake 146, contacts 148 being closed and contacts 149 being opened when the solenoid 147 is energized and contacts 148 opened and contacts 149 closed when the solenoid 147 is deenergized. The control of the current to the solenoids 135 and 147 is so arranged that solenoid 147 is energized and brake 146 released so that shaft 8 may rotate before solenoid 135 is energized and the casing 130 held causing the shaft 8 to rotate and the solenoid 135 is deenergized permitting the casing 130 to rotate and shaft 8 to stop rotating before solenoid 147 is deenergized and the brake 146 applied to stop the rotation of shaft 8.

On shaft 121 is secured a gear 150 which engages with a gear 151 rotatably mounted on a pin carried by a support comprising spaced side members 152. Mounted in the side members 152 is a bearing pin 153 on which gear 154 rotates and on which the arms 155 are pivotally mounted. The arms 155 are provided with lugs 156 which engage in arcuate slots 157 in the side members 152. Journaled in the lugs 156 is a shaft 158 which has mounted thereon a gear 159 which engages with the gear 154 and a gear 160 which engages with the gear 151. Mounting the gears 159 and 160 upon the arms 155 permits of the gear 160 being removed and a smaller or larger gear substituted and the arms 155 being moved by handle 161 to bring the new gear 160 into proper engagement with the gear 151, the gears 154 and 159 being in engagement in all positions of the arms 155. The arms 155 are secured in adjusted position by bolt 162 and clamping member 163. Engaging with the gear 154 is a gear 164 keyed on a shaft 165 journaled in the side members 152 and carrying a gear 166. Engaging with the gear 166 is a gear 167 mounted on a worm shaft 168 which, through a worm and worm wheel in casing 169, drives a shaft 170 having a frangible connection by means of a coupling 171, with the cam shaft 39. On the cam shaft 39 are cams 172 and 173 adapted to operate contacts 174 and 175, respectively, the cams 172 and 173 being so designed that the contacts 174 and 175 are closed only during a small portion of the revolution of each cam. Mounting the gear 160 so that it may be changed permits of adjusting the revolutions of the cam shaft 39 to the revolutions of the main drive shaft 8. With the proper ratio between the shafts 8 and 39 it is possible, by adjusting the speed of the driving motor 115, to have the shaft 39 make the same number of revolutions per minute for many designs of springs. Since the shaft 39 makes but one revolution for each spring wound, the speed of the shaft 39 will regulate the output of the machine and time the movements of the operator in feeding the heated stock to the machine.

Figure 16:
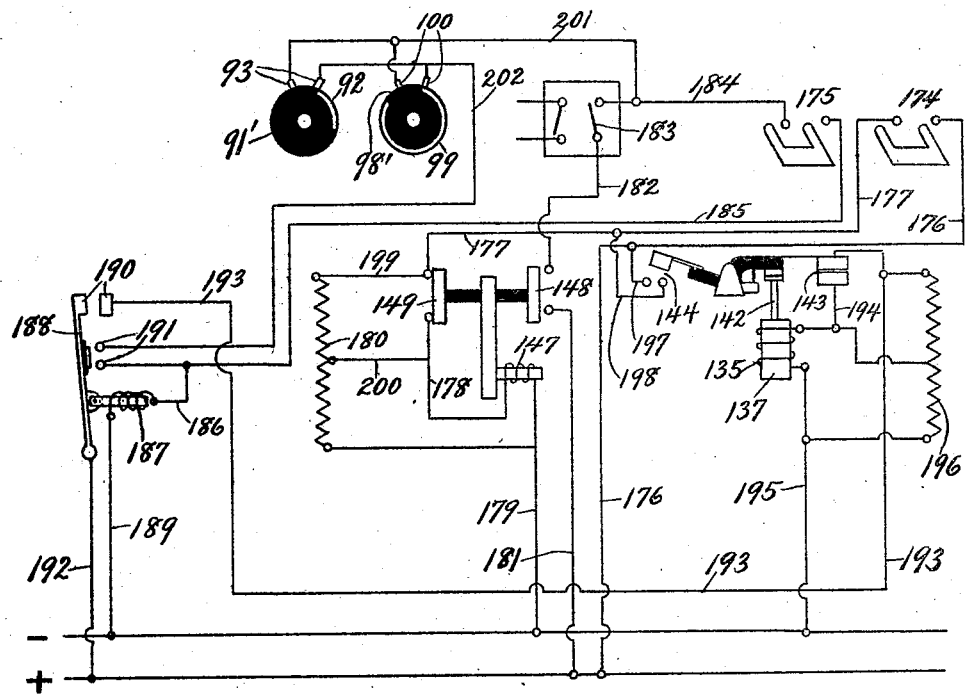
Fig. 16 is a diagram of the electrical control of my device.

In the operation of my device, the cam shaft 39 will be rotated continuously while the motor 115 is running. Rotation of the cam shaft 39 will operate the cams 38 and 44 to bring the mandrels 15 and 16 together; the cam 66 to return the plate 59 to its position during winding; the cam 56 to bring the dog 46 into engagement with the stock; and the cams 172 and 173 to close the contacts 174 and 175, respectively. Closing contacts 174 will complete a circuit from the positive side of the electric power supply, see Fig. 16, through conductor 176, contacts 174, conductor 177, contacts 149, conductor 178, solenoid 147, and conductor 179 to the negative side of the power supply, energizing the solenoid 147 and releasing the brake 146 so that the main drive shaft 8 may be rotated. Releasing the brake 146 causes contacts 149 to be opened and contacts 148 to be closed. Opening the contacts 149 causes the resistance 180 to be inserted in the circuit of the solenoid 147 reducing the current supplied to the solenoid 147 while the brake is held released. Closing the contacts 148 completes a circuit from the positive side of the power supply through conductor 181, contacts 148, conductor 182, normally closed push-button switch 183, conductor 184, contacts 175, conductors 185 and 186, magnet coil 187 of magnetically operated switch 188 and conductor 189 to the negative side of the power supply energizing the coil 187 and operating the switch 188 to closed position. Closing the switch 188 closes the main contacts 190 and auxiliary contacts 191. Closing the main contacts 190 completes a circuit from the positive side of the power supply through conductor 192, contacts 190, conductor 193, contacts 143, conductor 194, solenoid 135 and conductor 195 to the negative side of the power supply, energizing the solenoid 135 and operating the armature 137 to bring the brake shoes 133 to the brake drum 132 holding the casing 130 against rotation and causing the main drive shaft 8 to be operated, rotating the mandrels 15 and 16 and the contacts 92 and 99. Operation of the armature 137 will also cause contacts 144 to be closed and contacts 143 to be opened, inserting the resistance 196 in the circuit of the solenoid 135 and reducing the holding current supplied to solenoid 135. Closing the contacts 144 will complete a shunt circuit around the contacts 174 so that when the cam 172 permits contacts 174 to open there will be a circuit completed from the positive side of the power supply through conductor 176, conductor 197, contacts 144, conductors 198, 177 and 199, resistance 180, conductors 200 and 178, coil 147 and conductor 179 to the negative side of the power supply keeping the solenoid 147 energized and the brake 146 released. Operation of the contacts 92 and 99 as the mandrels 15 and 16 are rotated will cause the contacts 92 and 99 to complete the circuit across the contacts 93 and 100, respectively. The contact 92 revolves once for each coil in each spring wound and completes the circuit for a short time during each revolution while the contact 99 is revolved once for each spring wound and closes the circuit during the greater part of each revolution. The two contacts are placed in parallel in the circuit so that the circuit will be closed so long as it is closed at either contact and these contacts are so timed that the circuit is finally broken at the contact 92. As long as either contact 92 or 99 completes the circuit there is a circuit from the positive side of the power supply through conductor 181, contacts 148, conductor 182, switch 183, conductor 201, through either contacts 92 and 93 or contacts 99 and 100, conductor 202, auxiliary contacts 191, conductors 185 and 186, magnet coil 187 and conductor 189 to the negative side of the power supply energizing the magnet coil 187 and keeping the switch 188 closed when cam 173 permits the opening of contacts 175 so that solenoid 135 is kept energized and the main drive shaft 8 is kept operating and the brake 146 is held released.

The main drive shaft 8 is operated until the circuit through the magnet coil 187 is opened at the contacts 92, 93 and 99, 100 whereupon the switch 188 opens, breaking the circuit through the solenoid 135. The armature 137 thereupon falls releasing the brake shoes 133 from the brake drum 132, opening contacts 144 and closing contacts 143. Opening the contacts 144 opens the circuit through the solenoid 147 permitting the brake 146 to be applied, stopping the rotation of the main drive shaft 8 and opening contacts 148 and closing contacts 149. The operation of the main drive shaft 8 may also be stopped by operating the switch 183 which is a switch of the push-button type placed convenient to the operator for use in an emergency. When the main drive shaft 8 is stopped the rotation of the cam shaft 39 continues so that cam 56 retracts the dog 46 from the work, cams 38 and 44 withdraw the mandrels 15 and 16 from the spring and cam 66 moves back the plate 59 so that the finished spring may fall from the machine. Continued rotation of the cam shaft 39 thereupon restores the mandrels 15 and 16 and plate 59 to position, brings the dog 46 into engagement with the stock and closes contacts 174 and 175 to initiate the winding of the next spring.

In the modification shown in Fig. 17 the casings 2 and 3 contain the rotatable heads 4 and 5, as in Fig. 2. In the head 4 is a spindle 9′, adjustable in the head 4 but secured in adjusted position as by having the journal box 11 clamped in the guides in the pedestal 13 as by bolts 209. On the head 4 is the sprocket 70, as in Fig. 2. In place of a mandrel, the spindle 9′ carries a member 203 which serves as a face plate and engages the spring. The spindle 9′ is adjusted in the head 4 by shifting the journal box 11 in the pedestal 13 in order to vary the distance between the member 203 and the plate 45 to accommodate springs of different heights. The head 5 has a spindle 10 carrying a mandrel 16′, which extends to the member 203 and is changed for springs of different heights. The spindle 10 is operated by a pinion 204 engaging with a rack 205 and operated by a hand wheel 206. The head 5 is also provided with a dog 46 operated by a lever 47 connected to a sleeve 51 on the hub portion 52 of the head, the sleeve 51 being operated by the levers 54, as in Fig. 2. A cross piece 57 connects the casings 2 and 3 and carries a shiftable bracket 207 in which is mounted a roller wiping-in device 208 which engages the end of the stock and forces it into engagement with the mandrel 16′.

What I claim is:

1. In a spring coiling machine, a rotatable head, means to rotate said head, a continuously operating shaft, means operated by said shaft to effect the connection of said head and head operating means and means operated by the rotation of said head to stop the rotation of said head.

2. In a spring coiling machine, a rotatable head, means to rotate said head, a continuously operating shaft adapted to start the rotation of said head at predetermined intervals and means operated by the rotation of said head to stop the rotation of said head after a predetermined number of revolutions.

3. In a spring coiling machine, a rotatable head, a mandrel rotated by said head, a continuously operating shaft adapted to start the rotation of said head at predetermined intervals, means operated by said head to stop rotation of said head after a predetermined number of revolutions and means to vary the number of revolutions.

4. In a spring coiling machine, a rotatable head, a mandrel rotated by said head, a continuously operating shaft adapted to start the revolution of said head at predetermined intervals, means operated by said head to stop rotation of said head after a predetermined number of revolutions and means to vary the number of revolutions turned by the head and keep constant the intervals between successive starts of the head.

5. In a spring coiling machine, a mandrel, a drive shaft for said mandrel, an electrically operated means for causing rotation of said shaft, an electrically operated brake means for said shaft and an interlocking electric control for said electrically operated means.

6. In a spring coiling machine, a main drive shaft, an electrically operated means for causing rotation of said shaft, an electrically operated brake means for said shaft, an interlocking electrical control for said electrically operated means, and a continuously operating shaft adapted to initate the operation of said electrical control.

7. In a spring coiling machine, a main drive shaft, an electrically operated means for causing rotation of said shaft, an electrically operated brake means for said shaft, an interlocking electrical control for said electrically operated means, a continuously operating shaft adapted to initiate the operation of said electrical control and means operated from the main drive shaft to operate said electrical control to stop the rotation of said main drive shaft.

8. In a spring coiling machine, a main drive shaft, electrically operated means for starting and stopping the rotation of said drive shaft, a continuously operating cam shaft and contacts operated by said cam shaft for initiating the operation of said starting and stopping means.

9. In a spring coiling machine, a main drive shaft, electrically operated means for starting and stopping the rotation of said drive shaft, a continuously operating cam shaft, contacts operated by said cam shaft for initiating the energizing of said electrically operated means and means operated from said main drive shaft for keeping said electrically operated means energized during a predetermined operation of said main drive shaft.

10. In a spring coiling machine, a rotatable head, a shaft for driving said head, a mandrel movable in said head and a continuously operating shaft controlling the connection of said head and driving shaft and operating said mandrel in said head automatically in succession.

11. In a spring coiling machine, a rotatable head, a shaft for driving said head, a mandrel movable in said head and a continuously operating shaft automatically controlling the operation of said head by said driving shaft and operating said mandrel in said head at predetermined intervals.

12. In a spring coiling machine, a rotatable head, means to rotate said head, a mandrel rotatable with and movable in said head and means independent of said head rotating means to cause the rotation of said head and the movement of said mandrel in said head to occur in prearranged sequence and automatically repeating said sequence of operations at predetermined intervals.

13. In a spring coiling machine, a rotatable head, a mandrel movable in said head, a continuously operating shaft adapted to effect rotation of said head and movement of said mandrel in said head at predetermined intervals and means operated from said head to determine the extent of rotation of said head.

14. In a spring coiling machine, a rotatable head, a mandrel movable in said head, means to rotate said head, electrically operated means controlling said rotating means, a continuously operating shaft, means on said shaft controlling said electrically operated means and means on said shaft adapted to move said mandrel in said head.

15. In a spring coiling machine, a rotatable head, means to rotate said head, means connecting said head and head rotating means at predetermined regular intervals, means to stop the rotation of said head and controlling means for said stopping means adjustable to determine the stopping point of said head.

16. In a spring coiling machine, a rotatable head, means to rotate said head, means connecting said head and head rotating means at predetermined regular intervals, means to stop the rotation of said head and controlling means for said stopping means adjustable to determine the stopping point of said head and the number of revolutions made by said head.

17. In a spring coiling machine, a head, means for driving said head, a mandrel about which the spring is coiled movable in said head, a continuously operated shaft independent of said head and means on said shaft adapted to move said mandrel in said head.

18. In a spring coiling machine, a rotatable head, a mandrel and a work-holding dog movable in said head, a continuously operating shaft and means on said shaft to operate said mandrel and dog while said head is stopped.

19. In a spring coiling machine, a rotatable head, a mandrel and a work-holding dog movable in said head, a work-engaging plate movable with respect to said head, a continuously operating shaft and means on said shaft to operate said mandrel, dog and plate.

20. In a spring coiling machine, a rotatable head, a mandrel and a work-holding dog movable in said head and means to operate said mandrel and dog while said head is stopped.

21. In a spring coiling machine, a rotatable head, a mandrel and a work-holding dog movable in said head and means to operate said mandrel and dog automatically in succession while said head is stopped.

22. In a spring coiling machine, a rotatable head, a work-holding dog movable in said head, a sleeve movable on said head to operate said dog, levers for operating said sleeve, a shaft and means on said shaft for operating said levers.

23. In a spring coiling machine, a rotatable head, a spindle slidable in said head, a mandrel carried by said spindle, a slidably mounted journal box engaging said spindle, a rack carried by said journal box and means engaging said rack to shift said journal box, spindle and mandrel.

24. In a spring coiling machine, a rotatable head, means for rotating said head, a shaft driven from said head and a divided pitch screw detachably mounted on said shaft.

25. In a spring coiling machine, a rotatable head, means for rotating said head, a shaft driven from said head, a divided pitch screw detachably mounted on said shaft, stock feeding means shifted by said pitch screw, and means in said shaft permitting adjustment of said pitch screw with respect to said head.

26. In a spring coiling machine, a rotatable head, means for rotating said head, a shaft driven from said head, a pitch screw detachably secured to said shaft, stock feeding means shifted by said pitch screw and means adapted to hold said stock feeding means at one end of its travel.

27. In a spring coiling machine, means for coiling the spring, means for withdrawing the coiling means from the spring, driving means for said coiling means and means operating said withdrawing means adapted to control the connection of said driving means and coiling means.

28. In a spring coiling machine, means for coiling the spring, driving means for said coiling means, means to hold the coiled spring compressed and means operating said spring holding means adapted to control the connection of said driving means and coiling means.

29. In a spring coiling machine, means for coiling the spring, driving means for said coiling means, means adapted to hold the work for said coiling means, means holding the coiled spring compressed and means operating said work holding means and establishing the connection of said driving means and coiling means automatically at predetermined intervals.

30. In a spring coiling machine, means for coiling the spring, driving means for said coiling means, means for withdrawing said coiling means from the spring, means adapted to hold the work for said coiling means and means operating said withdrawing means and said work holding means and controlling the connection of said driving means and coiling means automatically at predetermined intervals.

31. In a spring coiling machine, means for coiling the spring, means adapted to hold the work for said coiling means, means for withdrawing said coiling means from the spring, means adapted to hold the coiled spring under compression and means automatically operating said work holding means, said withdrawing means and said spring holding means at predetermined intervals in a prearranged sequence.

32. In a spring coiling machine, a rotatable head, a mandrel rotatable with and movable in said head and means for rotating said head and moving said mandrel in said head in a prearranged sequence, said head being at rest during the movement of said mandrel.

33. In a spring coiling machine, a rotatable head, a mandrel rotatable with and movable in said head and means for rotating said head and moving said mandrel in said head in a prearranged sequence and repeating said series of operations at predetermined intervals, said head being at rest during the movement of said mandrel.

34. In a spring coiling machine, a rotatable head, a mandrel upon which a spring is wound movable longitudinally in said head, means to move said mandrel longitudinally in said head and cause rotation of said head and means operated by said head to automatically stop the rotation of said head.

35. In a spring coiling machine, a rotatable head, a mandrel movable in said head, means to operate said mandrel and cause rotation of said head and means operated by said head to automatically stop the rotation of said head, said operating means automatically repeating said operations at predetermined intervals.

36. In a spring coiling machine, a rotatable head, a mandrel movable in said head, means to operate said mandrel and cause rotation of said head at predetermined intervals in a prearranged sequence and means operated by said head to automatically stop the rotation of said head after a predetermined number of revolutions.

37. In a spring coiling machine, a rotatable head, a mandrel rotatable with and movable in said head, a work holding dog for said mandrel and means controlling the operation of said head and operating said mandrel and dog automatically at predetermined intervals in a prearranged sequence.

38. In a spring coiling machine, a rotatable head, a mandrel movable in said head, a work holding dog for said mandrel, a spring engaging plate and means operating said mandrel, dog and plate and controlling the operation of said head at predetermined intervals in a prearranged sequence.

39. In a spring coiling machine, a rotatable head, a mandrel movable in said head, a work holding dog for said mandrel, a continuously operating shaft, electrically operated means controlling the rotation of said head and cams on said shaft operating said mandrel and dog and controlling said electrically operated means.

40. In a spring coiling machine, a rotatable head, a mandrel movable in said head, means to operate said mandrel and cause rotation of said head at predetermined intervals in a prearranged sequence, means operated by said head to automatically stop the rotation of said head after a predetermined number of revolutions and means adjustable to vary the number of revolutions.

41. In a spring coiling machine, a rotatable head, a mandrel movable in said head, means to operate said mandrel and cause rotation of said head at predetermined intervals in a prearranged sequence, means operated by said head to automatically stop the rotation of said head after a predetermined number of revolutions and means adjustable to vary the number of revolutions and keep constant the intervals between successive starts of the head.

42. In a spring coiling machine, a rotatable head, a mandrel movable in said head, a main drive shaft to operate said head, an electrically operated means for causing operation of said main drive shaft, an electrically operated brake for said main drive shaft, operating means for said mandrel controlling said electrically operating means and an interlocking electric control for said electrically operated means and brake.

43. In a spring coiling machine, a rotatable head, a mandrel movable in said head, a main drive shaft to operate said head, an electrically operated means for causing operation of said main drive shaft, an electrically operated brake for said main drive shaft and operating means for said mandrel controlling said electrically operated means and brake.

44. In a spring coiling machine, a rotatable head, a mandrel movable in said head, a main drive shaft to operate said head, electrically operated means for causing operation of said main drive shaft, an electrically operated brake for said main drive shaft, a continuously operating shaft operating said mandrel and controlling the said electrically operated means and brake and an interlocking electrical control for said electrically operated means and brake.

45. In a spring coiling machine, a rotatable head, a mandrel movable in said head, a main drive shaft to operate said head, electrically operated means for causing operation of said main drive shaft, an electrically operated brake for said main drive shaft, a continuously operating shaft operating said mandrel and controlling said electrically operating means and brake, an interlocking electrical control for said electrically operating means and brake and means operated from said main drive shaft to operate said electrical control to stop the operation of said main drive shaft.

46. In a spring coiling machine, a rotatable head, a mandrel movable in said head, a main drive shaft to operate said head, electrically operated means for causing operation of said main drive shaft, an electrically operated brake for said main drive shaft, a continuously operating shaft operating said mandrel and controlling said electrically operated means and brake, an interlocking electrical control for said electrically operated means and brake and means operated from said main drive shaft to operate said electrical control to stop operation of said main drive shaft, said means being adjustable to vary the number of revolutions of said head.

47. In a spring coiling machine, a rotatable head, a mandrel movable in said head, a main drive shaft to operate said head, electrically operated means for causing operation of said main drive shaft, an electrically operated brake for said main drive shaft, a continuously operating shaft operating said mandrel and controlling said electrically operated means and brake, an interlocking electrical control for said electrically operated means and brake and means operated from said main drive shaft to operate said electrical control to stop the operation of said main drive shaft, said means being adjustable to vary the stopping point of said head.

48. In a spring coiling machine, a rotatable head, a mandred movable in said head, a main drive shaft to operate said head, electrically operated means for causing operation of said main drive shaft, an electrically operated brake for said main drive shaft, a continuously operating shaft operating said mandrel and controlling said electrically operated means and brake, an interlocking electrical control for said electrically operated means and brake and means operating from said main drive shaft to operate said electrical control to stop the operation of said main drive shaft, said means being adjustable to vary the stopping point of said head and vary the number of revolutions of said main drive shaft.

49. In a spring coiling machine, a rotatable head, means for rotating the head, a shaft driven from said head, a pitch screw carried by said shaft and means in said shaft for varying the angular relation of said head and pitch screw.

50. In a spring coiling machine, a rotatable head, means for rotating said head, a shaft driven from said head, a pitch screw carried by said shaft, stock feeding means shifted by said pitch screw and means adjustable on said pitch screw adapted to disengage said stock feeding means from said pitch screw.

51. In a spring coiling machine, a rotatable head, means for rotating said head, a shaft driven from said head, a pitch screw carried by said shaft, stock feeding means, a plunger carried by said stock feeding means adapted to engage said pitch screw to shift said stock feeding means, means adjustable on said pitch screw for disengaging said plunger from said pitch screw and means for holding said plunger disengaged.

52. In a spring coiling machine, a rotatable head, means for rotating said head, a shaft driven from said head, a pitch screw carried by said shaft, stock feeding means, a plunger carried by said stock feeding means adapted to engage said pitch screw to shift said stock feeding means, means adjustable on said pitch screw for disengaging said plunger from said pitch screw, means to hold said plunger disengaged, means to return said stock feeding means to its initial position and means releasing said plunger upon the return of said stock feeding means.

53. In a spring coiling machine, a rotatable head, means to rotate said head, a mandrel movable in said head, a continuously operating shaft, means operated by said shaft to control the rotation of said head by said rotating means and the movement of said mandrel in said head at predetermined intervals.

54. In a spring coiling machine, a rotatable head, a mandrel movable in said head, a work-holding dog for said mandrel, a shaft, electrically operated means controlling the rotation of said head and cams on said shaft operating said mandrel and dog and controlling said electrically operated means.

55. In a spring coiling machine, a shaft, a work-holding dog, a driving means for said shaft, a cam operated by said shaft, a lever operated by said cam, a reciprocating sleeve operated by said lever and a pivotally mounted member adapted to operatively connect said sleeve and dog.

In witness whereof I have hereunto set my hand.

JOHN M. ROHLFING.